United States Patent [19]

Crosbie et al.

[11] 4,456,664

[45] Jun. 26, 1984

[54] ELECTRONICALLY CONDUCTIVE MAGNESIA DOPED OXIDE CERAMICS FOR USE IN SODIUM SULFUR BATTERIES

[75] Inventors: Gary M. Crosbie, Dearborn; Gerald J. Tennenhouse, Southfield; Ragnar P. Tischer, Birmingham; Halina S. Wroblowa, West Bloomfield, all of Mich.

[73] Assignee: Ford Motor Company, Dearborn, Mich.

[21] Appl. No.: 503,202

[22] Filed: Apr. 19, 1983

[51] Int. Cl.$^3$ .................................... H01M 10/39
[52] U.S. Cl. .................................. 429/104; 252/518
[58] Field of Search .................. 429/104, 163, 176; 252/518

[56] References Cited

U.S. PATENT DOCUMENTS

| | | | |
|---|---|---|---|
| 3,959,013 | 5/1976 | Breiter | 136/6 FS |
| 3,966,492 | 6/1976 | Ludwig | 136/6 FS |
| 3,985,575 | 10/1976 | Ludwig | 429/103 |
| 3,994,745 | 11/1976 | Ludwig | 429/81 |
| 4,048,390 | 9/1977 | Chatterji | 429/102 |
| 4,084,042 | 4/1978 | Ludwig | 429/104 |
| 4,110,516 | 8/1978 | Breiter | 429/104 |
| 4,117,209 | 9/1978 | Markin et al. | 429/104 |
| 4,131,226 | 12/1978 | Breiter | 228/198 |
| 4,160,069 | 7/1979 | Johnson et al. | 429/104 |
| 4,216,275 | 8/1980 | Hartmann et al. | 429/104 |
| 4,226,922 | 10/1980 | Sammells | 429/104 |
| 4,232,098 | 11/1980 | Park et al. | 429/104 |
| 4,248,943 | 2/1981 | Ludwig et al. | 429/104 |

FOREIGN PATENT DOCUMENTS 2013022 1/1979 United Kingdom ............... 429/104

OTHER PUBLICATIONS

"Electrical Conduction in $Fe_2O_3$ and $Cr_2O_3$," D. de Cogan and G. A. Lonergan, Solid State Communications, vol. 15, pp. 1517-1519, 1974.

*Primary Examiner*—Donald L. Walton
*Attorney, Agent, or Firm*—Lorraine S. Melotik; Roger L. May

[57] ABSTRACT

This invention relates to electrically conductive current collectors suitable for use at high temperatures and in the presence of corrosive environments, e.g., the sodium-sulfur battery. The current collectors comprises metal or metal alloys coated with ceramic material comprising chromium oxides doped with at least 0.05 mole percent magnesia. The corrosion resistant current collectors may be container/current collectors.

11 Claims, No Drawings

ELECTRONICALLY CONDUCTIVE MAGNESIA DOPED OXIDE CERAMICS FOR USE IN SODIUM SULFUR BATTERIES

TECHNICAL FIELD

This invention relates to electronically conductive, corrosion resistant ceramic materials suitable for use in high temperature applications in the presence of corrosive environments. More particularly, this invention relates to magnesia doped chromium oxide suitable as coatings for the container and the current collector in energy conversion devices such as the sodium sulfur battery.

BACKGROUND ART

Secondary batteries employing sulfur electrodes operate at relatively high temperatures which accelerate the corrosion of cell materials which contact the sulfur, e.g., the container/current collector. Container corrosion can have diverse effects: apart from attacking the material and "eating up" active reactant (thereby reducing capacity), it forms surface layers that increase contact resistance to the electrode normally used in such batteries. Also soluble corrosion products can be redeposited, clogging the electrode, obstructing transport of active materials, and causing uneven current distribution. If deposited on the electrode surface, they change its structure and wettability and therewith the kinetics of reactions occurring at this surface to the point where it may become partially or completely blocked. Corrosion products can also be deposited on the surface of the solid electrolyte partially blocking, damaging or destroying it by causing locally excessive current densities or by direct interaction or penetration.

In an attempt to overcome these corrosion problems, a variety of electrically conductive materials have been proposed as coatings for the container current collector in a Na/S battery.

In U.S. Pat. No. 3,959,013, proposal is made to use a corrosion resistant and electronically conducting layer of molybdenum or graphite to reduce the corrosion associated with such a battery. The corrosion resistant coating is placed on the surface of the metallic container which is to confine the molten sodium polysulfide and sulfur reactants.

In a similar manner, U.S. Pat. No. 4,048,390 suggests that a protective coating of aluminum be placed on the surface of the battery container which is to confine the polysulfide and sulfur reactants. This patent proposes the use of aluminum because it forms a continuous layer of aluminum sulfide over its exposed surfaces.

U.S. Pat. No. 4,110,516 takes still another direction in trying to develop a corrosion resistant container to confine the sodium polysulfide and sulfur reactants. The patent suggests forming the confining container of aluminum and then placing over the aluminum either a single layer of chrome or a layer of zinc and a layer of chrome thereover, the chrome surface being the surface which faces up against the corrosive reactants which are to be confined therewithin.

U.S. Pat. No. 4,131,226 once again discloses a sulfur electrode container for a sodium sulfur battery in which a liner material is used as an anticorrosive surface for a mild steel container. The patent teaches that the discrete liner of clad material can be formed of metal such as stainless steel, molybdenum or a nickel/chromium alloy, as specifically disclosed therein.

In U.S. Pat. No. 4,160,069, the current collector comprises a corrosion resistant ceramic member and an intimately attached metal cladding. The ceramics employed comprise doped rutile $TiO_2$, doped calcium titanate and lanthanum strontium chromite.

U.S. Pat. No. 4,216,275 attempts to overcome the corrosive nature of the polysulfide melt of a Na/S battery by providing a light metal cell wall which is coated first with a prime coat of nickel and aluminum, and then applying on this prime coat, a coating of an alloy of chromium and at least one metal of the group iron, cobalt or nickel.

U.S. Pat. No. 4,226,922 suggests that longevity of the cathodic current collector can be obtained if the metallic current collector has a boronized surface and an additional boron source in physical proximity to the boronized current collector surface.

Still another approach to forming a non-corrosive, electrically conductive component for a sodium sulfur cell is taught in U.S. Pat. No 4,232,098. The component comprises a fiber-carbon substrate and a non-porous chromium-iron-carbon duplex alloy surface layer chemically diffusion bonded to the substrate.

In U.S. Pat. No. 4,248,943 a coating of chromium/chromium oxide is placed on the surfaces of the electrically conducting components of a Na/S battery to combat corrosion by molten sodium polysulfide and sulfur reactant.

Few conductive materials can withstand the attack of the polysulfide melt at the operating temperature of the Na/S cell.

Metals are thermodynamically unstable. They form sulfides, whose solubility in the melt is, in most cases, not negligible. Some metals like chromium, molybdenum tungsten, and aluminum become covered by protective layers which, however, lose their passivating properties under certain conditions. Ceramic materials such as chromium oxide, which exhibit good corrosion stability in polysulfide melts, do not however have sufficient electronic conductivity to be employed in current collectors. Dopants are sometimes employed in ceramics to increase the conductivity of the ceramics. However some dopants, e.g., NiO, while increasing conductivity of $Cr_2O_3$, compromise its corrosion resistance.

Useful coatings employed on the container/current collector of a Na/S cell must have good corrosion stability to the polysulfide melt, sufficient conductivity, and preferential wettability for sodium polysulfide rather than sulfur. It has not been found that chromium oxide ($Cr_2O_3$) material doped with magnesium oxide, MgO, satisfies these requirements. In addition to these inherent material properties, chronium oxide coatings display the following characteristics: adherence to the substrate under conditions of thermal cycling, cost viability and a relatively simple method of deposition on the substrate.

DISCLOSURE OF THE INVENTION

The invention of this application comprises an improved electrically conductive current collector suitable for use at high temperatures and in the presence of corrosive environments, characterized in that the current collector comprises: metal or metal alloy having a ceramic coating, at least in the region in contact with the corrosive environment, wherein the ceramic coating comprises chromium oxide doped with at least about 0.05, preferably between about 0.05-2 mole percent magnesium oxide based on moles of chromium oxide. Preferably, the ceramic coating has a thickness of between about 0.1 and about 20 m and a resistivity of less than about 100 ohm-centimeters at the temperatures of the environment in which the current collector is employed, e.g., in an electrochemical cell or battery. Preferably the metal or metal alloy, having the ceramic oxide coating, comprises chromium. In a modified embodiment of the current collector of this invention, a layer of chromium, preferably an alloy comprising chromium, may be employed as a current conducting layer between the doped ceramic oxide layer and other electrically conducting components made, e.g., of iron.

This invention is also directed to an electrochemical cell or battery employing the current collector described above wherein the current collector may serve as a current collector/container.

Advantageously, the ceramic coating materials of this invention current collector have shown no signs of corrosion to corrosive materials such as sulfur or polysulfides, when exposed to polysulfide melt at 350° C. for periods of up to 6 months. During this time, they were polarized anodically, cathodically, and/or cycled at current densities sufficient to expose the ceramic surfaces to the entire span of melt compositions between sulfur and $Na_2S_3$, to which parts of the container (current collector) can be exposed locally. Still further, it has been found that while the resistivity of the doped ceramic oxide may increase somewhat upon exposure to the environment of a sulfur-polysulfide melt, advantageously the resistivity stabilizes at acceptable values.

BEST MODE FOR CARRYING OUT THE INVENTION

As discussed briefly above, the current collector of this invention comprises the combination of an electronically conducting doped ceramic oxide, which is corrosion resistant to the substances to which the current collector is to be exposed at elevated temperatures, with a metal conductor intimately attached at the ceramic-metal interface.

The doped ceramic oxide of this invention, as described above, comprises chromium oxide ($Cr_2O_3$) doped with at least about 0.05, more preferably between about 0.05-2 mole percent magnesium oxide, MgO, wherein the mole percent of magnesia dopant is based on the moles of the chromium oxide.

One method of making the doped ceramic oxide of this invention comprises adding chromium oxide and the dopant, or more generally, a material capable of generating the dopant to acetone and milling the mixture. After drying the powder, it is calcined and subsequently milled. Materials which may be suitably used in forming the doped ceramic oxide to provide the magnesium oxide dopant, include, but are not limited to, magnesium carbonate hydrate, magnesium oxide and magnesium metal, with the magnesium carbonate-hydrate being most preferred. While one method of preparing the doped ceramic oxide has been described above, other commonly employed methods for preparing the doped ceramic oxide of this invention would be well known to those skilled in the art. The doped ceramic may also be subjected to further heat treating, such as oxidizing or annealing in air and sintering. Doped ceramic oxides according to this invention may be used to form coatings or hot pressed objects having densities generally greater than 90%, generally greater than about 95%, of theoretical. By subjecting the doped ceramic oxide coated current collector, e.g., having a chromium alloy substrate, to oxidizing treatment, uncoated sites on the substrate which are connected to micropores in the coating would be converted to corrosion resistant chromium oxide. While chromium oxide is itself nonconducting, such oxidizing treatment will not have an adverse effect on the resistivity of the doped coating.

The doped ceramic oxide powder may be used to coat a metal or metal alloy conductor by a variety of methods which include sputtering and plasma spraying. Sputtering techniques which could be used in this invention for applying a coating of the ceramic oxides on a substrate are well known in the art. One description of this technique is found in the book "Thin Film Processes", J. L. Vossen and W. Kern, editors, Academic Press, N.Y., 1978. Similarly, a reference exemplifying the plasma spraying of ceramic oxides is "Plasma Spraying with Chromium Oxides," P. Boch, P. Fauchais, and A. Borie, pp. 208-211 of P. Vincenzini Ed., *Advances in Ceramic Processing* (3rd CIMTEC, Rimini, Italy, 1976), Natl. Res. Council, Faenza, Italy, 1977.

Suitable metal or metal alloys include, but are not limited to, aluminum, nickel, chromium, iron, silicon, molybdenum and their alloys, gold, platinum and combinations of these. Chromium and, more particularly, alloys containing chromium are preferred, with ferritic alloys containing chromium being most preferred. The ceramic coating is generally applied on the metal or metal alloy to a thickness of between about 0.1 $\mu$m and about 20 $\mu$m, whereby the ceramic oxide coating has a resistivity of less than about 100 ohm-centimeter, more preferably, less than about 10 ohm-centimeter.

In one embodiment of this invention, the current collector can serve as a current collector container of an electrical cell or battery. Exemplary of this embodiment, a container, e.g., stainless steel container, may be internally coated with a doped chromium oxide taught herein. In another embodiment of the invention of the invention of this application, it may be desirable to employ a layer of metal or metal alloy between the ceramic oxide and the electrically conducting component. In this second embodiment, the intermediate layer comprises a metal or metal alloy as those described above, preferably however this intermediate layer comprises an alloy comprising chromium. For example, a layer of an alloy comprising chromium (ferritic stainless steel) may be employed between the doped ceramic oxide coating and a component containing iron, (e.g., mild steel). Thus if the container of an electrochemical cell or battery is mild steel, the alloy comprising chromium layer and subsequently the ceramic coating would be layered on the inside of the container, affording a corrosion resistant, electrically conducting container/current collector. This intermediate layer could be applied by a variety of methods including sputtering, aqueous electroplating, plasma spraying, etc.

Current collectors of the invention as described above would be useful as current collectors or as current collector/containers in a variety of applications wherein a corrosion resistant, electronically conducting member operative at high temperatures is desirable, such as in electrochemical cells or batteries, e.g., molten carbonate fuel cells or Na/S batteries. Current collectors of this invention wherein the ceramic coatings have resistivities of less than about 100 ohm-centimeter, preferably less than about 10 ohm-centimeters, are most useful in such applications. The ceramic oxide coatings on the current collectors suitable for use in Na/S batteries consist of chromium oxide doped with greater than about 0.05, preferably between about 0.05–2 mole percent magnesium oxide. A Na/S battery is an electrical conversion device of the type which comprises (1) an anodic reaction zone containing a molten alkali metal reactant-anode in electrical contact with an external circuit; (2) a cathodic reaction zone containing a cathodic reactant comprising a molten liquid electrolyte which is electrochemically reactive with the anodic reactant and a current collector at least one surface of which is exposed to the cathodic reactant; and (3) a cation permeable barrier to mass liquid transfer interposed between and in contact with the anodic and cathodic reaction zones, the current collector being in electrical contact with both the cation-permeable barrier and said external circuit. The current collector may also serve as a container for the cathodic reactant. In a Na/S battery, the anodic reactant is sodium and the cathodic reactant comprises molten polysulfide salts or a mixture of sulfur and sulfur saturated molten polysulfide salts. Such sodium/sulfur electrical storage cells are well known to those skilled in the art and are disclosed in the following U.S. Pat. Nos. 3,404,035; 3,404,036; 3,413,150; 3,446,677; 3,458,356; 3,468,709; 3,468,719; 3,475,220; 3,475,223; 3,475,225; 3,535,163; and 3,719,531.

The following examples are presented by way of description of the composition of the invention and set forth to best mode contemplated by the inventors but are not to be construed as limiting.

EXAMPLE 1

Chromium oxide of moderate purity was used in combination with magnesium carbonate hydrate. The composition was chosen to result in a 0.5 mol.% solid solution of magnesium oxide in $Cr_2O_3$. The principal impurities in the oxide were determined by mass spectrometric analysis and wet chemical analysis to be Na (1500 ppmw), Ca (ppmw), P and Si (100 ppmw), and K (ppmw). Sulfur (less than 5000 ppmw as sulfate) present in the starting powder would be expected to volatilize in subsequent processing. The magnesium nitrate hydrate was assayed for MgO equivalent.

The oxide (150 gram) and nitrate-hydrate (0.48 gram) were added to reagent grade acetone (180 mL) and milled. The resulting slurry was ultrasonically dispersed and then stirred to dryness at low heat. The dry powder was calcined for 1 hour at 1100° C. in air and lightly milled.

One hundred fifty gram amount of powder were prepressed without binder in steel dies, which were lubricated with silicone spray. The resulting preform was coated with lubricating grade boron nitride, which was slurried in ethanol. The billet was hot-pressed in a prefired graphite die at the following conditions: 28 MPa, 1300° C., for 1 hour. A density of 94.0% of theoretical maximum density (which is 5.21 g/cm³) was achieved.

The billet was annealed for 6 hours at 1500° C. in air. Rectangular bars were diamond ground from the central section of the billet.

Characteristics of the material were as follows: Grain size was approximately 2 micrometers. The electrical resistivity at 350° C. was between 4.3 and 5.4 ohm-cm. The temperature dependence of resistivity corresponded to a value of 0.32 to 0.37 eV. The bars were subjected to a corrosive environment consisting of sodium polysulfide at 350° C.

Sodium polysulfide was prepared according to standard procedures from reagent sodium monosulfide and resublimed sulfur. In particular, the components were melted in a closed ampoule for 24 hours and powered after cooling.

The test sample was dove-tailed and fastened by Dylon cement to a high purity graphite rod. The sample was exposed to polysulfide without current flow for 90 days at 350° C. The sample was then determined to have a resistivity of 97 ohm-cm at 350° C., ex situ, and a temperature dependence of resistivity of 0.33 to 0.46 ev.

No sign of corrosion was observed by surface examination (SEM, EDX, AES)* or by analysis of the melt.
*(SEM: Scanning Electron Microscopy, EDX: Energy Dispersive X-ray Analysis, AES: Auger Electron Spectroscopy).

The resistivity of the material after 3 months exposure remained suitably low for use as a container coating material.

EXAMPLE 2

The process and performance of a magnesium oxide doped chromium oxide with a higher level of doping than in Example 1 is described here.

Chromium oxide of moderate purity was used in combination with magnesium carbonate hydrate. The composition was chosen to result in a 1.0 mol.% solid solution of magnesium oxide in $Cr_2O_3$. The principal impurities in the oxide were determined by mass spectrometric analysis and wet chemical analysis to be Na (1500 ppmw), Ca (200 ppmw), P and Si (100 ppmw) and K (5 ppmw). Sulfur (less than 5000 ppmw as sulfate) present in the starting powder would be expected to volatilize in subsequent processing. The magnesium nitrate hydrate was assayed for MgO equivalent.

The oxide (150 gram) and nitrate-hydrate (0.96 gram) were added to reagent grade acetone (180 mL) and milled. The resulting slurry was ultrasonically dispersed and then stirred to dryness at low heat. The dry powder was calcined for 1 hour at 1100° C. in air and lightly milled.

One hundred fifty gram amount of powder were prepressed into a billet as described in Example 1. The billet was then hot-pressed in a prefired graphite die at the following conditions: 28 MPa, approximately 1250° C. for 1 hour. A density of 89.2% of theoretical maximum density (which is 5.21 g/m cubed) was achieved.

The billet was annealed for 6 hours at 1500° C. in air. Rectangular bars were diamond ground from the central section of the billet.

Characteristics of the material were as follows: Grain size was not determined. The electrical resistivity at 350° C. was between 3.8 and 4.3 ohm-cm. The temperature dependence of resistivity corresponded to a value of 0.33 to 0.36 eV.

Sodium polysulfide was prepared according to standard procedures in Example 1. The test sample was dove-tailed and fastened by Dylon cement to a high purity graphite rod. Voltammetric and resistance measurements were carried out through the course of a 159 day exposure with current flowing. During this time, the sample was exposed anodically, cathodically, as it was cycled at current densities which were sufficient to expose the sample surface to the entire span of melt compositions between sulfur and sodium trisulfide, to which part of the container (current collector) can be exposed locally. The sample was then determined to have a resistivity of 163 ohm-cm at 350° C., ex situ, and a temperature dependence of resistivity of 0.33 to 0.36 eV.

No sign of corrosion was observed by surface examination (SEM, EDX, AES) or by analysis of the melt.

The resistivity of the material after 63 days exposure remained suitably low for use as a container coating material. For this resistivity of material, a coating thickness of no greater than about 6 $\mu$m would generally be used so as to result in a coating having a resistivity of less than about 100 ohm-cm.

EXAMPLE 3

The use of a plasma-sprayed coating of magnesium-doped chromium oxide is described in this example.

Chromium oxide powder with magnesium oxide doping at the 0.5 mol. % level is prepared from moderate purity chromium oxide and magnesium carbonate hydrate. The process for powder synthesis is the same as that used in Example 1, through the stage of calcining. The calcined powder is used as the feed powder for plasma spraying.

The substrate for plasma spraying is a stainless steel rod which is machined to a bullet-like shape, with a hemispherical end. The alloy used is a ferritic one with 26 weight percent chromium (Cr) and 1 weight percent molyebdenum (Mo), commonly designated "E-Brite." The surface is prepared by sand-blasting. No intermediate bond coat is used.

The substrate is mounted in a lathe, rotated, and coated with a layer of magnesium-doped chromium oxide of a thickness estimated to be 10 $\mu$m. Sodium polysulfide is prepared according to standard procedures described in Example 1.

The bullet-like sample with the coating is attached with a threaded connector to a long Mo rod. The sample is immersed with the hemispherical end first into the polysulfide melt.

In view of the disclosure, many modifications of this invention will be apparent to those skilled in the art. It is intended that all such modifications which fall within the true scope of this invention be included within the terms of the appended claims.

We claim:

1. An improved electrically conductive current collector suitable for use at high temperatures and in the presence of corrosive environments, characterized in that the current collector comprises a metal or metal alloy having a ceramic coating thereon, at least in the region in contact with said corrosive environment, wherein said ceramic coating comprises chromium oxide doped with at least 0.05 mole percent magnesium oxide based on moles of said chromium oxide.

2. An improved electrically conductive current collector according to claim 1, wherein said ceramic coating has a thickness of between about 0.1 $\mu$m and about 20 $\mu$m and a resistivity of less than about 100 ohm-centimeters at the temperatures of the environment in which said current collector is employed.

3. An improved electrically conductive current collector according to claim 1, wherein a layer comprising an alloy of chromium is located between said metal or metal alloy and said ceramic coating.

4. An improved electrically conductive current collector according to claim 1, wherein said magnesium oxide dopant is present in a range of about 0.05 and about 2 mole percent.

5. An improved electrically conductive current collector according to claim 1, wherein said metal or metal alloy is selected from the group consisting of aluminum, nickel, chromium, silicon, iron, molybdenum and their alloys, gold, platinum, and combinations thereof.

6. An improved electrically conductive current collector according to claim 5, wherein said metal or metal alloy comprises chromium.

7. In an electrochemical cell or battery comprising:
(1) an anodic reaction zone containing a molten alkali metal reactant anode in electrical contact with an external circuit;
(2) a cathodic reaction zone containing a cathodic reactant comprising a molten liquid electrolyte which is electrochemically reactive with said anodic reactant and a current collector at least one surface of which is exposed to said cathodic reactant; and
(3) a cation permeable barrier to mass liquid transfer interposed between and in contact with said anodic and cathodic reaction zones, said current collector being in electrical contact with both said cation-permeable barrier and said external circuit, wherein the improvement comprises:
employing as said current collector in said device a current collector comprising a metal or metal alloy having a ceramic coating thereon, at least in the region in contact with said cathodic reactant, wherein said ceramic coating comprises chromium oxide doped with at least 0.05 mole percent of magnesium oxide based on moles of chromium oxide, said current collector being disposed within said cathodic reaction zones such that said ceramic coating but not said metal or metal alloy is exposed to said molten cathodic reactant.

8. An electrical conversion device according with claim 7, wherein said current collector also serves as a container for said cathodic reactant.

9. An electrical conversion device according to claim 7, wherein said anodic reactant is sodium and said cathodic reactant comprises molten polysulfide salts or a mixture of sulfur and sulfur saturated molten polysulfide salts.

10. An electrical conversion device according to claim 7, wherein said ceramic coating consists of said chromium oxide doped with between about 0.05 to about 2 mole percent magnesium oxide.

11. An electrical conversion device according to claim 7, wherein said ceramic coating has a thickness of between about 0.1 $\mu$m and about 20 $\mu$m and a resistivity of less than about 100 ohm-centimeters at the temperature of the environment which said current collector is employed.

* * * * *